Patented Sept. 10, 1929.

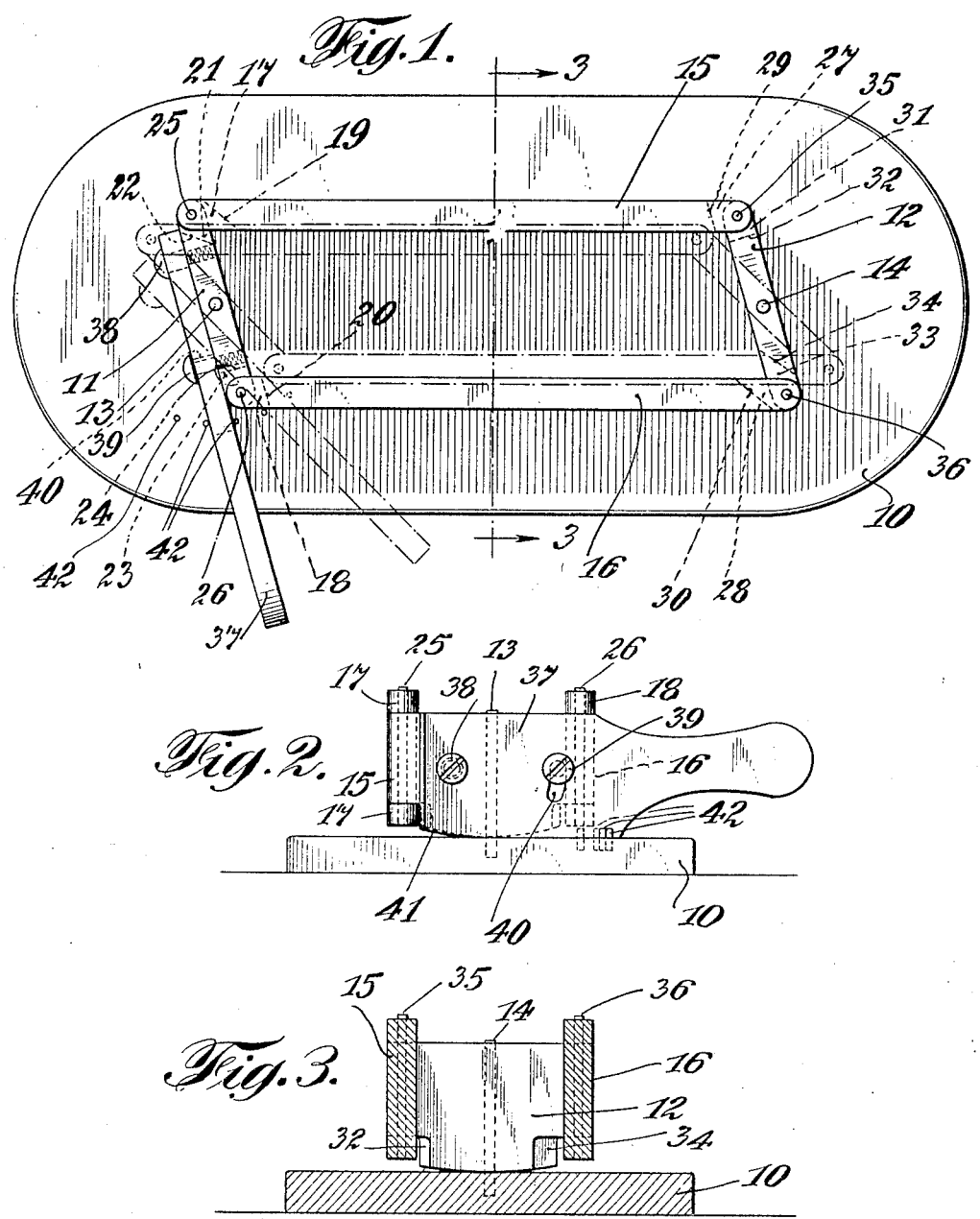

1,727,979

UNITED STATES PATENT OFFICE.

JOHN O. HUNT, OF BROOKLYN, NEW YORK, ASSIGNOR TO BIAGIO A. FURIATI, OF BROOKLYN, NEW YORK.

MEAT HOLDER.

Application filed November 19, 1926. Serial No. 149,292.

The object of the present invention is the provision of a meat holder adapted to receive and clamp and thus hold meat in position so that it may be readily carved. I am aware that heretofore various forms of meat holders have been employed for somewhat similar purposes. So far as the same have come to my attention, however, these meat clamps have been constructed to so clamp the meat as to hold the same in such a manner as to be cut transversely or across the grain of the meat. In certain kinds of prepared meat, for example hams which are cured in a manner peculiar to an Italian custom the meat is not only elongated but when carved is cut longitudinally of the grain, that is with the grain rather than across the grain.

The meat holder made in accordance with my present invention is particularly adapted to receive and clamp pieces of meat, as hams for example, which have been somewhat elongated in their treatment in being cured and which is adapted for use in Italian and other delicatessen shops as well as other places where according to custom in carving the meat the same is cut longitudinally of the grain.

The meat holder made in accordance with this invention will be hereinafter more particularly described in conjunction with the accompanying drawings in which Figure 1 is a plan of a meat holder made in accordance with this invention.

Fig. 2 is an end view of the same, and

Fig. 3 is a section on line 3—3, Fig. 1.

Referring to the drawing it will be seen that in carrying out my invention the meat holder made in accordance therewith preferably includes a base 10 which may be made of any suitable material and in any desired configuration. Mounted on this base there is a swinging frame forming a clamp for receiving and holding a piece of meat together with means for adjusting the frame to position and securing the parts thereof in place. This swinging frame as illustrated preferably comprises end bars 11 and 12 which are suitably spaced and in centrally disposed positions are pivotally connected to the base as for example by the pivot pins 13 and 14. The swinging frame also includes side rails 15 and 16 which are appreciably longer than the end bars making the frame rectangular in configuration. The side rail 15 at one end thereof is provided with a notch 17 and the corresponding end of the side rail 16 is similarly notched as indicated at 18. The base or inner face of the notch 17 is at an angle to the side faces of the rail 15 as indicated at 19, and the inner face or base of the notch 18 is likewise at an angle to the sides of the rail 16 as indicated at 20. The extremities of the end bar 11 are formed as tongues or projections 21 and 23 and the inner face of the bar forming the projection 21 provides a shoulder made at an angle to the sides of the bar as designated at 22. Similarly the projection at the other end of the bar 11 provides an inclined face 24 forming a shoulder with the projection 23. The tongues or projections 21 and 23 are adapted to fit within the adjacent notched ends of the side rails 15 and 16 and to be pivotally connected thereto by means of pins 25 and 26 or otherwise.

Similarly at the opposite end of the frame the ends of the side rails 15 and 16 are notched as indicated at 27 and 28. The inner face or base of the notch 27 is at an angle to the sides of the rail 15 as indicated at 29 preferably at an angle corresponding to that at which the base 20 of the notch 18 is made in the diametrically opposite corner of the frame. The inner face or base of the notch 28 is at an angle to the sides of the rail 16 as indicated at 30 and preferably at the same angle as the base 19 of the notch 17 at the diametrically opposite corner of the frame. The extremities of the end bar 12 are formed to provide tongues or projections 31 and 33. One of the faces defining this projection as indicated at 32 is at an angle to the sides of the end bar, the angle corresponding with that at which the face 24 forming the shoulder in the end bar 11 at the diametrically opposite corner of the frame is formed. Similarly the face 34 forming the shoulder at the other end of the end bar 11 is made at an angle to the sides of the end bar which angle is substantially the same as that of the face 22 defining part of the projection at the end of the bar 11 at the diametrically opposite corner of the frame. The tongues or projections at the extremities of the end bar 12 are adapted to fit within the notches 27 and 28 at the adjacent ends of the side rails 15 and 16 and to be pivotally connected thereto by means of pins 35 and 36. It will now be understood that the frame as thus constructed may be adjusted by turning the end bars on their pivotal points causing the corners of the frame to swing on their pivotal points to move the side rails toward and away from each other while maintaining a substantially parallel condition in all of the positions in which they may be placed.

The swinging frame as hereinbefore described may be actuated and held in place by any suitable mechanism. As illustrated, however, I employ a handle lever 37. At one end this is pivotally connected to the end bar 11 by a screw 38 acting as a pivot on which the lever may be swung. I also employ a pin or screw 39 passing through a slot 40 provided for this purpose in the handle and turned down into the end bar 11 for assisting in maintaining the handle in position and also for limiting the swinging movement thereof. In the construction of the handle the lower edge thereof adjacent the end at which it is pivotally mounted is preferably curved or rounded as indicated at 41, permitting the handle as will be understood to be moved upwardly from its normal position as indicated in Fig. 2. Also associated with the handle and preferably secured in the base there is a series of stop pins 42 between any pair of which the handle when in its normal position may be placed to fix the frame in position after having a piece of meat clamped between the side rails 15 and 16, it being understood that the handle may be swung upwardly from the position as shown in Fig. 2 sufficiently far to permit the lower edge thereof to clear the upper ends of the stop pins to enable the operator to thereby move the handle and adjust the frame to any desired position.

In the use of the meat holder as hereinbefore described the handle 37 is raised and employed to move the parts of the frame to the position in which the side rails 15 and 16 are spaced the maximum distance apart. A ham or other elongated piece of meat is then placed between the side rails 15 and 16 and the handle moved in the opposite direction to so move the parts of the frame as to cause the side rails 15 and 16 to approach each other thereby engaging and clamping the ham or other meat between them. As will be apparent, the meat may be so engaged by the side rails as to have the major portion thereof extending above the side rails whereby as will now be understood the meat may be readily carved by cutting the same longitudinally, that is with the grain as is customary in various places for example delicatessen shops where the proprietors cater particularly to a certain class of trade that makes it necessary to cut the meat in this manner. It will be equally obvious that from time to time the meat may be shifted to various positions in the holder and that when the movable frame in which the meat is clamped is locked in position by setting the handle between any set of the stop pins 42 the parts will be secured in place with the meat held in position therein until it becomes necessary to shift the position of the meat in order to carve another portion thereof.

I claim as my invention:

1. In a meat holder, a base, a frame comprising sets of oppositely disposed members, one set of the oppositely disposed members being pivotally mounted in the base, means for connecting the sets of oppositely disposed members, and means for moving the oppositely disposed members of the frame for gripping and securing in position a piece of meat and locking the members of the frame with the said piece of meat between the parts thereof.

2. In a meat holder, a base, a frame comprising oppositely disposed end bars pivotally connected to the said base and oppositely disposed side rails pivotally connected at their ends to the ends of the said end bars, and means for moving the said parts of the frame and locking the same in position to secure in place a piece of meat between the said side rails.

3. In a meat holder, a base, a frame comprising oppositely disposed end bars pivotally connected to the said base and oppositely disposed side rails pivotally connected at their ends to the ends of the said end bars, a handle pivotally connected adjacent one end to an end portion of one of the end bars, and stop members carried by the said base and so placed that the lower adjacent portion of the said handle is adapted to fit between sets thereof to secure the same and the said members of the frame in position with a piece of meat clamped between the said side rails.

4. In a meat holder, a base, a frame comprising sets of oppositely disposed members, one set of the oppositely disposed members being pivotally connected to the said base, means for pivotally connecting the said sets of oppositely disposed members, and means for moving the said oppositely disposed members of the frame for gripping and securing in position a piece of meat placed between the members of the frame.

Signed by me this 5th day of November, 1926.

JOHN O. HUNT.